(12) United States Patent
Mondello et al.

(10) Patent No.: US 11,463,263 B2
(45) Date of Patent: Oct. 4, 2022

(54) SECURE EMERGENCY VEHICULAR COMMUNICATION

(71) Applicant: Micron Technology, Inc., Boise, ID (US)

(72) Inventors: Antonino Mondello, Messina (IT); Alberto Troia, Munich (DE)

(73) Assignee: Micron Technology, Inc., Boise, ID (US)

( * ) Notice: Subject to any disclaimer, the term of this patent is extended or adjusted under 35 U.S.C. 154(b) by 348 days.

(21) Appl. No.: 16/362,822

(22) Filed: Mar. 25, 2019

(65) Prior Publication Data

US 2020/0313900 A1    Oct. 1, 2020

(51) Int. Cl.
*H04L 9/32* (2006.01)
*H04L 9/08* (2006.01)
*H04L 9/40* (2022.01)

(52) U.S. Cl.
CPC .......... *H04L 9/3247* (2013.01); *H04L 9/0825* (2013.01); *H04L 63/0442* (2013.01); *H04L 2209/805* (2013.01); *H04L 2209/84* (2013.01)

(58) Field of Classification Search
CPC . H04L 9/3247; H04L 9/0825; H04L 63/0442; H04L 2209/805; H04L 2209/84
(Continued)

(56) References Cited

U.S. PATENT DOCUMENTS 6,222,461 B1 * 4/2001 Hazen ..................... B61L 29/28 340/436
6,732,020 B2 * 5/2004 Yamagishi ............. G08G 1/205 340/436

(Continued)

FOREIGN PATENT DOCUMENTS

WO    2017-147207 A1    8/2017

OTHER PUBLICATIONS

Dennis Mattoon, "Implementing DICE", Mar. 20, 2018, Trusted Computing Group, pp. 1-8; https://develop.trustedcomputinggroup.org/2018/03/20/implementing-dice/#:~:text=DICE%20is%20a%20new%20standardized,secrets%20to%20enable%20security%20features. (Year: 2018).*
U.S. Appl. No. 15/853,498, entitled, "Physical Unclonable Function Using Message Authentication Code", filed Dec. 22, 2017, 28 pages.

(Continued)

*Primary Examiner* — Taghi T Arani
*Assistant Examiner* — Blake I Narramore
(74) *Attorney, Agent, or Firm* — Brooks, Cameron & Huebsch, PLLC

(57) ABSTRACT

Secure emergency vehicular communication is described herein. An example apparatus can include a processing resource, a memory having instructions executable by the processing resource, and an emergency communication component coupled to the processing resource. The emergency communication component can be configured to generate an emergency private key and an emergency public key in response to being within a particular proximity from a vehicular communication component associated with a vehicular entity and in response to receiving a vehicular public key from the vehicular communication component. The emergency communication component can be configured to provide the emergency public key, an emergency signature, and notification data to the vehicular communication component.

23 Claims, 9 Drawing Sheets

(58) Field of Classification Search
CPC ... H04W 4/46; H04W 12/03; H04W 12/0471; H04W 4/90

See application file for complete search history.

(56) References Cited

U.S. PATENT DOCUMENTS

| | | | | |
|---|---|---|---|---|
| 8,594,616 | B2* | 11/2013 | Gusikhin | H04W 4/44 455/404.1 |
| 8,892,855 | B2* | 11/2014 | Leclercq | H04L 9/0819 713/1 |
| 9,516,500 | B2* | 12/2016 | Ho | H04L 9/3263 |
| 10,379,537 | B1* | 8/2019 | Arden | G01C 21/362 |
| 10,536,271 | B1* | 1/2020 | Mensch | H04L 9/0866 |
| 2006/0227008 | A1* | 10/2006 | Bryant | G08G 1/0965 340/902 |
| 2009/0259841 | A1* | 10/2009 | Laberteaux | H04L 63/0823 713/156 |
| 2010/0040234 | A1* | 2/2010 | Alrabady | H04L 9/321 380/278 |
| 2011/0090093 | A1* | 4/2011 | Grimm | G08G 1/162 340/901 |
| 2012/0079279 | A1* | 3/2012 | Leclercq | H04L 9/0869 713/187 |
| 2014/0079217 | A1* | 3/2014 | Bai | H04W 12/50 380/270 |
| 2014/0093074 | A1* | 4/2014 | Gotze | H04L 9/3278 380/45 |
| 2014/0270172 | A1* | 9/2014 | Peirce | H04L 9/083 380/270 |
| 2015/0039514 | A1* | 2/2015 | Beiser | G06Q 20/08 705/44 |
| 2017/0111353 | A1* | 4/2017 | Tschache | H04W 12/0431 |
| 2017/0310674 | A1* | 10/2017 | Markham | H04L 63/061 |
| 2019/0089687 | A1* | 3/2019 | Fiske | H04L 9/3066 |
| 2019/0207755 | A1* | 7/2019 | Gu | G06F 21/606 |
| 2019/0215163 | A1* | 7/2019 | Suleiman | H04L 9/3247 |

OTHER PUBLICATIONS

U.S. Appl. No. 16/201,652, entitled, "Parking Infrastructure Powered by a Decentralized, Distributed Database", filed Nov. 27, 2018, 27 pages.

U.S. Appl. No. 15/993,119, entitled, "Transmission of Vehicle Route Information by Passive Devices", filed May 30, 2018, 25 pages.

U.S. Appl. No. 16/034,763, entitled, "Secure Vehicular Communication", filed Jul. 13, 2018, 37 pages.

U.S. Appl. No. 16/034,809, entitled, "Secure Vehicular Services Communication", filed Jul. 13, 2018, 36 pages.

PCT International Application No. PCT/IB2019/000089, entitled, "Method for Improving Safety of a Component or System Running a Firmware or a Finite State Machine", filed Feb. 22, 2019, 42 pages.

International Search Report and Written Opinion from related International Application No. PCT/US2020/021668, dated Jul. 2, 2020, 10 pages.

* cited by examiner

US 11,463,263 B2

SECURE EMERGENCY VEHICULAR COMMUNICATION

TECHNICAL FIELD

The present disclosure relates generally to apparatuses and methods related to vehicles, and more particularly, to secure emergency and/or vehicular communication.

BACKGROUND

Motor vehicles, such as autonomous and/or non-autonomous vehicles, (e.g., emergency vehicles such as ambulances, police vehicles, etc. and non-emergency vehicles such as automobiles, cars, trucks, buses, etc.) can use visual and/or audible sensory cues to obtain information about the present of an approaching emergency vehicle. For example, an emergency vehicle can alert a non-emergency vehicle of the emergency vehicle's presence and approach using sirens and/or flashing lights to avoid interference with the non-emergency vehicle. As used herein, an autonomous vehicle can be a vehicle in which at least a portion of the decision-making and/or control over vehicle operations is controlled by computer hardware and/or software/firmware, as opposed to a human operator. For example, an autonomous vehicle can be a driverless vehicle.

DETAILED DESCRIPTION

Figure 1:
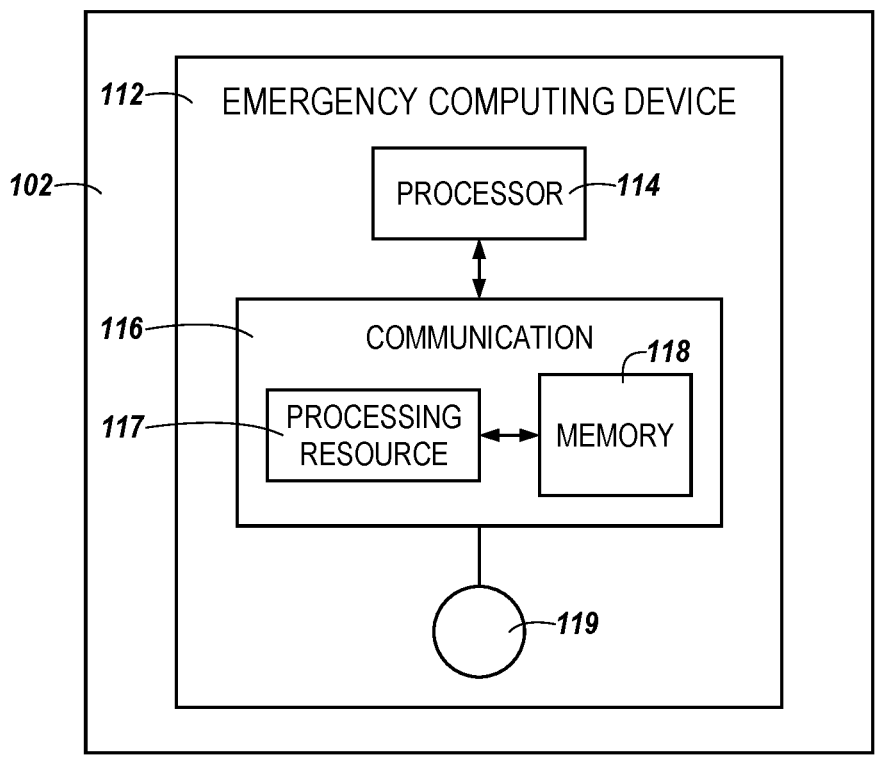
FIG. 1 is a block diagram of an example emergency entity, in accordance with an embodiment of the present disclosure.

Secure emergency vehicular communication is described herein. An example emergency entity can include a processing resource, a memory having instructions executable by the processing resource, and an emergency communication component coupled to the processing resource. The emergency communication component can be configured to generate an emergency private key and an emergency public key in response to being within a particular proximity from a vehicular communication component associated with a vehicular entity and in response to receiving a vehicular public key from the vehicular communication component. The emergency communication component can be configured to provide the emergency public key, an emergency signature, and notification data to the vehicular communication component.

In some previous approaches, an emergency entity (e.g., an ambulance, police car, etc.) can communicate with other vehicular entities using flashing lights, sirens, etc. In the example where an emergency entity communicates with an autonomous vehicular entity, the communication may not be secure. For example, the communication between the emergency entity and the vehicular entities and/or an additional emergency entity may be intercepted and/or manipulated by a hacker or other entities in order to change the communication, repeat the communication to gain unauthorized access to the emergency entity or vehicular entities, etc. In such instances, the emergency entity may not provide an ability to verify its identity to insure to the recipient of the communication that the emergency entity is authorized to provide such communication (e.g., to pull over, to stop the vehicle, to reduce a speed of the vehicle, to clear or exit a roadway, to park as soon as possible, to assist others on the road in an emergency, etc.). Absent an ability to verify the identity of the emergency entity, the communication may be unauthorized and may negatively affect the vehicular entity or request the vehicular entity to perform actions that the emergency entity does not have authorization to request.

An emergency communication component associated with an emergency entity can provide authorization data, including an emergency signature, that can verify the emergency entity's identity and insure that requests made to other vehicles is authorized, resulting in secure communication and an increase in compliance by other vehicle's as verification of the identity of the emergency entity can indicate the emergency entity has proper authority to request such compliance. However, in previous approaches, the communication between the emergency entity and the vehicular entity (or another emergency entity) can be both public and unsecured, introducing possible nefarious activity that can negatively affect the ability of an actual emergency entity to gain compliance by other vehicles.

As will be described herein, by introducing a secure form of communication for providing requests and verifying an identity of an emergency entity and/or a vehicular entity, an ability to accurately identify who is requesting and/or receiving the request data, information related to nefarious activity in relation to the request data can be rejected, avoided, discarded, etc. Public keys can be exchanged and used to encrypt data while private keys, which remain private and exclusive to a single entity, can be used to decrypt data. In this way, those without the private key are prevented from intercepting service data and using it for purposes other than initially intended. Further, certificates and signatures can be generated using private keys to verify identities of a sender of data and insure that data originates from an intended or claimed source.

FIG. 1 is a block diagram of an example emergency entity 102, in accordance with an embodiment of the present disclosure. The emergency entity 102 can be an autonomous emergency vehicle, a traditional non-autonomous emergency vehicle, a service vehicle, or the like. The emergency entity 102 can include an emergency computing device 112, such as an on-board computer. As shown, the emergency computing device 112 can include a processor 114 coupled to an emergency communication component 116, such as a reader, writer, transceiver, and/or other computing device or circuitry capable of performing the functions described below to exchange information, that is coupled to (e.g., or includes) an antenna 119. The emergency communication component 116 can include logic and/or circuitry that is used to perform the actions recited below (e.g., encrypt/decrypt, execute instructions, etc.). Emergency communication component 116 can include a processing resource 117 coupled to a memory 118, such as a non-volatile flash memory, although embodiments are not so limited. The emergency computing device 112 can be coupled to or within an emergency entity 102 such as an ambulance, a police vehicle, a fire truck, etc.

Figure 2:
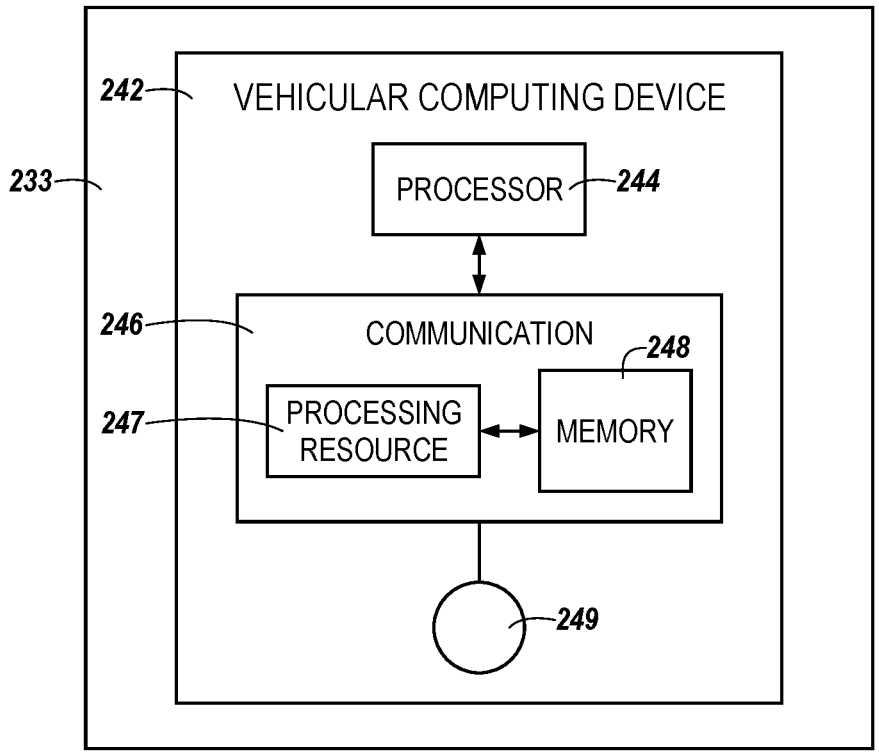
FIG. 2 is a block diagram of an example vehicular entity in accordance with an embodiment of the present disclosure.

Emergency communication component 116 can receive traffic, road, and/or vehicle data from additional computing devices, such as a vehicular entity 233 described in association with FIG. 2, or an additional electronic sign, electronic and/or digitized roadway, etc. As an example, a roadway and/or sign can be coupled to, or have embedded within the roadway and/or sign, a communication component (similar to emergency communication component 116) that can communicate data associated with road/sign conditions, road/sign status, etc.

FIG. 2 is a block diagram of a vehicular entity 233. The vehicular entity 233 can include an autonomous vehicle, a non-autonomous vehicle, an additional emergency vehicle, etc. The vehicular entity 233 can be coupled to a vehicular computing device 242. The vehicular computing device 242 can use various communication methods, such as wireless communication, to communicate with the emergency computing device 112. In the example of FIG. 2, the vehicular computing device 242 can include a processor 244 to execute instructions and control functions of the vehicular computing device 242. The processor 244 may be coupled to a vehicular communication component 246, such as a reader, writer, transceiver, and/or other computing device or circuitry capable of performing the functions described below to exchange information, that is coupled to (e.g., or includes) an antenna 249. Vehicular communication component 246 can include a processing resource 247 coupled to a memory 248, such as a non-volatile flash memory, although embodiments are not so limited. The antenna 249 of the vehicular computing device 242 can be in communication with, e.g., communicatively coupled to, the antenna 119 of the emergency computing device 112 shown in FIG. 1.

In some examples, antennas 249 and 119 can be loop antennas configured as inductor coils, etc. Antenna 119 can loop around emergency computing device 112, for example. Antenna 119 can generate an electromagnetic field in response to current flowing through antenna 119. For example, the strength of the electromagnetic field can depend on the number of coils and the amount of current. The electromagnetic field generated by antenna 119 can induce current flow in an antenna 249 that powers the respective vehicular computing device 242. As an example, antenna 119 in FIG. 1 can induce current flow in antenna 249 when the vehicular computing device 242 is brought within a communication distance (e.g., a communication range) of the antenna 119. For example, the communication distance can depend on the strength of the electromagnetic field generated by antenna 119. The electromagnetic field generated by antenna 119 can be set, by the number of coils of antenna 119 and/or the current passing through antenna 119, such that the communication distance can span from the location of the emergency computing device 112 to the vehicular computing device 242. In some examples, the communication distance can be about 50 centimeters to about 100 centimeters on either side of the emergency computing device 112. In the alternative, the communication distance can depend on the strength of the electromagnetic field generated by antenna 249. In this instance, the electromagnetic field generated by antenna 249 can be set by the number of coils of 249 and/or the current passing through antenna 249.

In some examples, the vehicular computing device 242 can include a number of wireless communication devices, such as transmitters, transponders, transceivers, or the like. As an example, the vehicular communication component 246 can be such a wireless communication device. Wireless communication that can be used can include near field communication (NFC) tags, RFID tags, or the like. In at least one embodiment, wireless communication can be performed using non-volatile storage components that can be respectively integrated into chips, such as microchips. Each of the respective chips can be coupled to a respective antenna, such as antenna 249. The respective storage components can store respective emergency, notification, vehicle, road, and/or sign data.

Emergency data can be transmitted from the emergency communication component 116 of the emergency computing device 112 to the vehicular communication component 246 of the vehicular computing device 242 in response to the emergency computing device 112 passing within the communication distance of the respective vehicular computing device 242. The emergency and/or notification data can be transmitted in the form of signals, such as radio frequency signals. For example, the emergency communication component 116 of the emergency computing device 112 and the vehicular communication component 246 of the vehicular computing device 242 can communicate using radio frequency signals.

For examples in which wireless communication devices are NFC tags, emergency communication component 116 of the emergency computing device 112 can be an NFC reader and can communicate with wireless communication devices using an NFC protocol that can be stored in memory 118 for processing by processing resource 117. In one example, the emergency communication component 116 and wireless communication devices, such as vehicular communication component 246, can communicate at about 13.56 megaHertz according to the ISO/IEC 18000-3 international standard for passive RFID for air interface communications. For example, the information can be transmitted in the form of a signal having a frequency of about 13.56 mega-Hertz.

In some examples, a vehicular computing device 242 can be used to collect emergency, notification, and/or vehicle data, such as a status of an approaching emergency vehicle, a notification to perform an action by the vehicular entity (e.g., to pull over, to stop the vehicle, to reduce a speed of the vehicle, to clear or exit a roadway, to park as soon as possible, to assist others on the road in an emergency, etc.), vehicle identification data, etc. For example, the current emergency vehicle status (e.g., location, speed, type of emergency addressed by vehicle), an identity of the emergency vehicle, and/or a date and time can be transmitted from the emergency communication component 116 to the vehicular communication component 246.

In some examples, the emergency computing device 112 and/or the vehicular computing device 242 can use a passive wireless communication device, such as a short-range communication device (e.g., an NFC tag) that can be as described previously. The NFC tag can include a chip having a non-volatile storage component that stores information, such as emergency information, identity information, emergency device or apparatus information, and/or information about an emergency, a roadway, other vehicles, such as the location, quantity, etc. of other vehicles. Further, the NFC tag can include an antenna.

The emergency communication component 116 can receive information from the NFC tag and/or can transmit information to the NFC tag. In some examples, a communications device can include a reader (e.g., an NFC reader), such as an emergency device reader.

The memory 118 of the emergency communications component 116 can include instructions that operate according to an NFC protocol that allows emergency communications component 116 to communicate with the NFC tag. For example, the emergency communications component 116 and the NFC tag can communicate using the NFC protocol, such as at about 13.56 mega-Hertz and according to the ISO/IEC 18000-3 international standard.

The emergency communications component 116 may also communicate with an emergency operations center, such as a hospital, a fire station, a police station, etc. For example, emergency communications component 116 can be wirelessly coupled or hardwired to the emergency operations center. In some examples, emergency communications component 116 can communicate with the emergency operations center via WIFI or over the Internet. The emergency communications component 116 can energize the NFC tag when the antenna 119 associated with the NFC tag is brought within a communication distance of antenna 249, as described previously. The communication distance can be shorter and bring the devices relatively near each other and can provide better security and use less power than previous approaches that use RFID tags.

Figure 3:
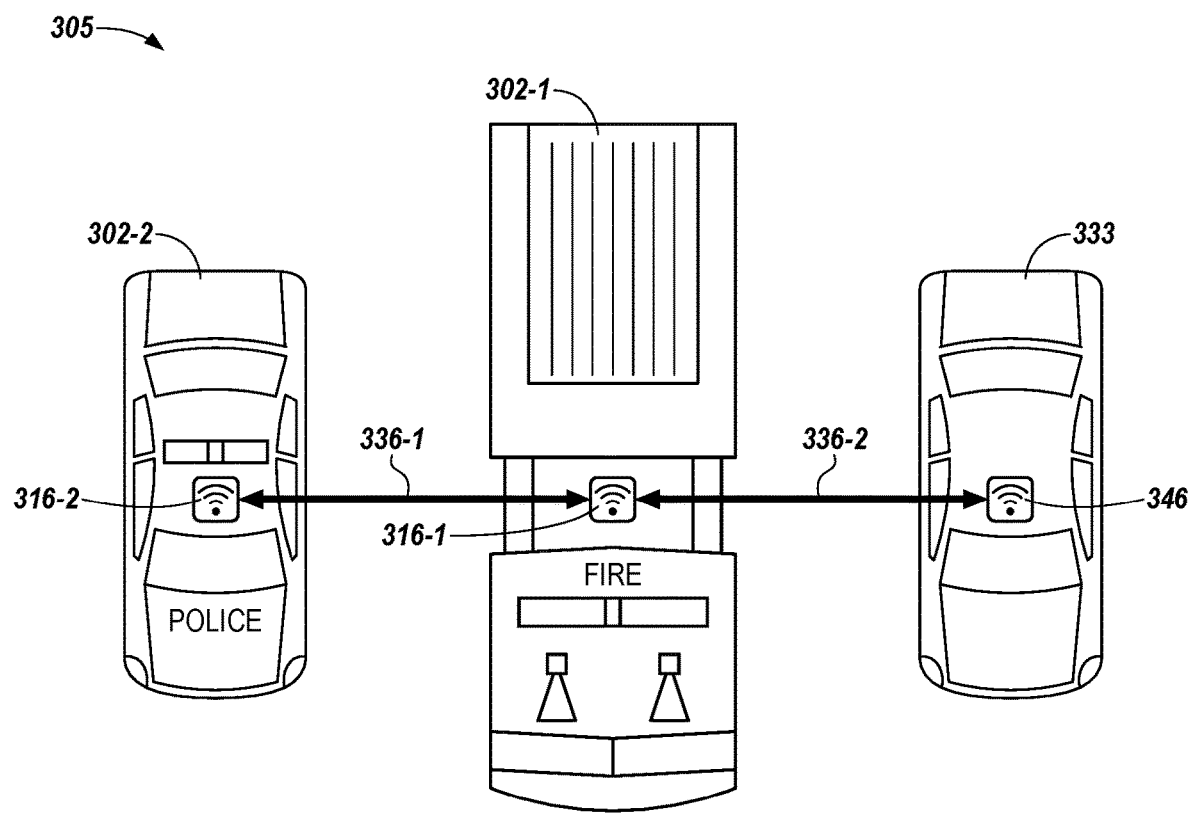
FIG. 3 is an example environment, including emergency entities and a vehicular entity in accordance with an embodiment of the present disclosure.

FIG. 3 illustrates an example environment, including emergency entities and a vehicular entity in accordance with an embodiment of the present disclosure. As illustrated in FIG. 3, a first emergency communication component 316-1 can be coupled to and/or be associated with a first emergency entity (e.g., a first truck, as illustrated in this example) 302-1. A second emergency communication component 316-2 can be coupled to and/or be associated with a second emergency entity (e.g., a police vehicle, as illustrated in this example) 302-2. A vehicular communication component 346 can be coupled to and/or be associated with a vehicular entity 333. The first emergency communication component 316-1 can be in communication with, indicated by arrow 336-1, the second emergency communication component 316-2. The first emergency communication component 316-1 can be in communication, indicated by arrow 336-2, with the vehicular communication component 346.

As the first emergency communication component 316-1 of the emergency entity 302-1 approaches within a particular proximity of the vehicular communication component 346, communication, indicated by arrow 336-2, can begin including identification and authentication of the emergency entity 302-1 by the vehicular communication component 346. The particular proximity, in this example, can refer to a distance of between 50 cm, 500 meters, etc. Embodiments, however, are not limited to a particular proximity. In an example, the particular proximity can depend on a type of antenna (such as antenna 119 in FIG. 1 and antenna 249 in FIG. 2).

The communication, indicated by arrow 336-1, between the first emergency communication component 316-1 and the second emergency communication component 316-2 can include an exchange of emergency data and security data to coordinate the first emergency entity 302-1 and the second emergency entity 302-2. The security data can include a public identification, a certificate identification, a public key, and an emergency signature, as will be described further in association with FIGS. 4A-9. Once the security data is verified by each of the first emergency entity 302-1, the second emergency entity 302-2, and/or the vehicular entity 333, emergency, vehicle, and other data can be exchanged between and/or among the first emergency entity 302-1, the second emergency entity 302-2, and/or the vehicular entity 333. This emergency and/or vehicle data can include a type of emergency occurring in the area of the vehicles, an action to be performed by vehicles in the area (e.g., to pull over, to stop the vehicle, to reduce a speed of the vehicle, to clear or exit a roadway, to park as soon as possible, to assist others on the road in an emergency, to gain priority on a roadway (e.g., traffic lights turn green when entering) etc.), an identification of which vehicles are in an area for safety reasons (e.g., criminal activity), coordination of other emergency vehicles and non-emergency vehicles for quick and efficient passage through a roadway by particular vehicles, etc. The secure emergency and/or vehicle data can be exchanged in such a way as to prevent a hacker or nefarious device from intercepting the secure emergency and/or vehicle data and manipulating the data in order to negatively affect the emergency entity, the vehicular entity, and/or additional vehicles.

The secure emergency and/or vehicle data received from the first emergency entity 302-1 to the vehicular entity 333 can be transmitted to additional vehicular entities (not illustrated) or additional devices along the roadway to be transmitted to further devices and/or vehicles downstream the roadway from the first emergency entity 302-1 and/or the vehicular entity 333. This can include communication with emergency operations center (mentioned above) that may need updates and/or additional information as events are progressing in real-time in order to be prepared to address an emergency as it unfolds and/or as victims and/or other people are being transported to the emergency operations center. In some embodiments, the vehicular entity can also communicate to an emergency entity that a particular emergency has occurred, which type of emergency the vehicular entity is referring to, etc., so that an emergency entity can be notified and/or alerted in order to request that the emergency entity come to the location to offer assistance.

Figure 4A:
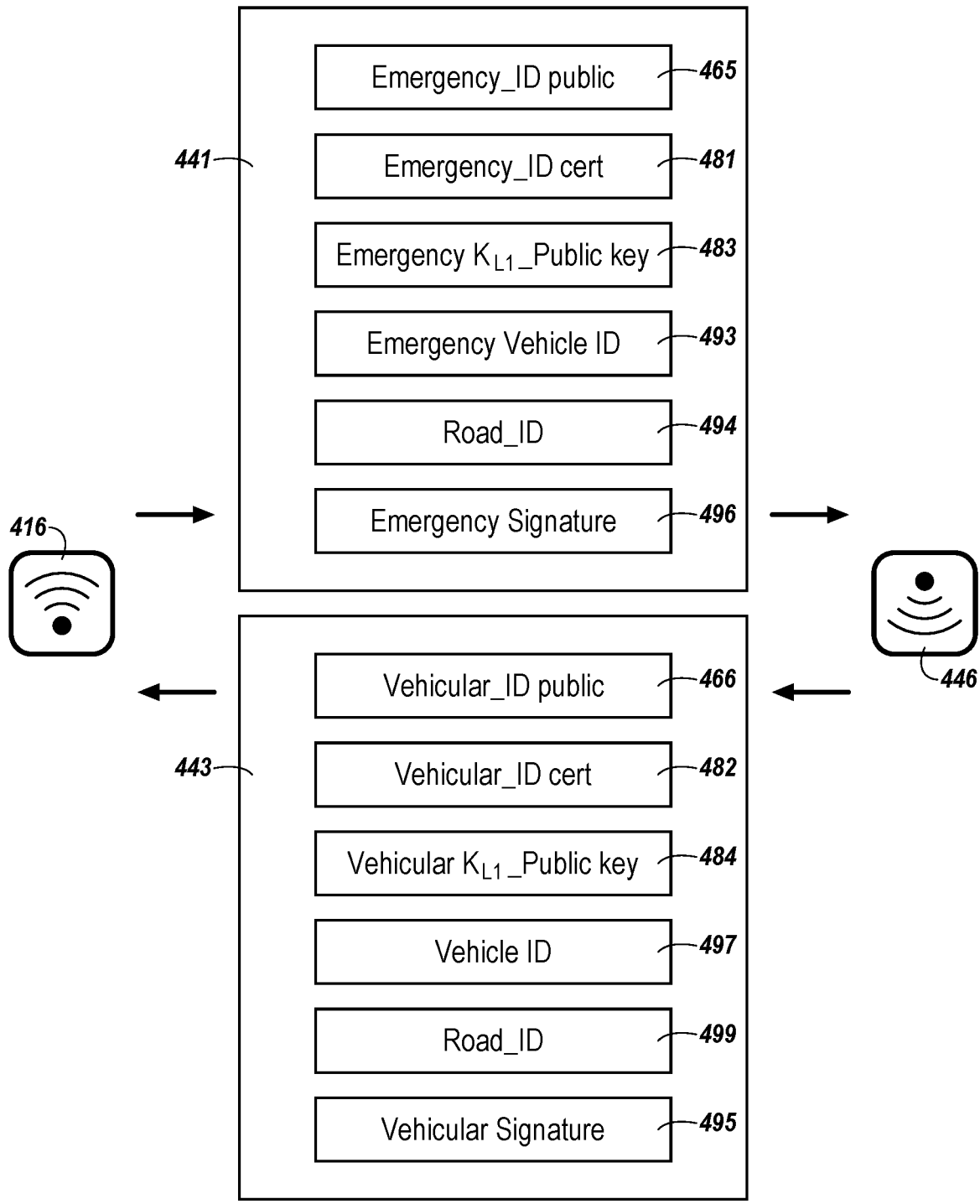
FIGS. 4A-B are each an example transmittal of authentication data between an emergency communication component and a vehicular communication component (4A) or between an emergency communication component and an additional emergency communication component (4B) in accordance with an embodiment of the present disclosure.

FIG. 4A is an illustration of an exchange of authentication data 441, 443 between an emergency communication component 416 and a vehicular communication component 446. The portion of authentication data 441 transmitted by the emergency communication component 416 and received by the vehicular communication component 446 can include an emergency public identification ("Emergency_ID public) 465, an emergency identification certificate ("Emergency_ID cert") 481, an emergency public key ("Emergency $K_{L1}$_Public key") 483, an Emergency vehicle identification ("Emergency Vehicle ID") 493, a road identification ("Road_ID") 494, and an emergency signature ("Emergency Signature") 496. The emergency public identification 465 can be used to determine an identity of the emergency entity and the emergency identification certificate 481 can be used to verify that the identity of the emergency entity is authenticated. The emergency public key 483 can be used to encrypt data to be sent to the emergency communication component 416 in order for the emergency communication component 416 to decrypt the received data using its own private key, as will be described further in association with FIGS. 5-9. The emergency vehicle identification 493 can indicate a unique identity of the vehicle, such as a vehicle identification number (VIN) or some other identifying data. A road identification 494 can indicate which road and/or which location along that road the emergency entity is on or located at.

An emergency signature 496 is used to verify that the data is sent from an authorized entity such that data with this verifiable signature is from the sender that the emergency entity is claiming to be. The emergency signature 496 is generated by encrypting the signature using the emergency private key (which is private only to that emergency entity) and is decrypted using the publicly provided emergency public key. A further description of the signature verification is described below in association with FIG. 9.

The portion of authentication data 443 transmitted by the vehicular communication component 446 and received by the emergency communication component 416 can include a vehicular public identification ("Vehicular_ID public") 466, a vehicular identification certificate ("Vehicular_ID cert") 482, a vehicular public key ("Vehicular_$K_{L2}$_Public key") 484, a vehicle identification ("Vehicle_ID") 497, a road identification ("Road_ID") 499, and a vehicular signature ("Vehicular Signature") 495. The vehicular public identification 466 can be used to determine an identity of the vehicular computing device sending the security data and the vehicular identification certificate 482 can be used to verify that the identity of the vehicular device is authenticated. The vehicular public key 484 can be used to encrypt data to be sent to the vehicular communication component 446 in order for the vehicular communication component 446 to decrypt the received data using its own private key, as will be described further in association with FIGS. 5-9. The vehicle identification 497 can indicate a unique identity of the vehicle, such as a vehicle identification number (VIN) or some other identifying data. A road identification 499 can indicate which road and/or which location along that road the emergency entity is on or located at.

A vehicular signature 495 is used to verify that the data is sent from an authorized entity such that data with this verifiable signature is from the sender that the vehicular entity is claiming to be. The vehicular signature 495 is generated by encrypting the signature using the vehicular private key (which is private to only that vehicular entity) and is decrypted using the publicly provided vehicular public key. A further description of the signature verification is described below in association with FIG. 9.

These public keys (emergency and vehicular) can be used to encrypt data sent to each respective communication component and verify an identity of each in order to exchange emergency and/or vehicle data. As an example, as will described further below in association with FIGS. 5-9, the emergency communication component 416 can encrypt data using the received vehicular public key 484 and send the encrypted data to the vehicular communication component 446. Likewise, the vehicular communication component 446 can encrypt data using the received emergency public key 483 and send the encrypted data to the emergency communication component 416. Data, such as vehicle data sent by the vehicular communication component 446 can include vehicle location data, vehicle identity data, etc. Confirmation of receipt of the vehicle data can be sent with a digital signature to verify an identity of the emergency communication component 416.

In an example, data exchanged between the emergency communication component 416 and the vehicular communication component 446 433 can have a freshness used by the other. As an example, data sent by the emergency communication component 416 to the vehicular communication component 446 in receipt of the emergency and/or vehicle data can be altered at each of a particular time frame or for a particular amount of data being sent. This can prevent a hacker from intercepting previously sent data and sending the same data again to result in the same outcome. If the data has been slightly altered but still indicates a same instruction, the hacker may send the identical information at a later point in time and the same instruction would not be carried out due to the recipient expecting the altered data to carry out the same instruction.

The data exchanged between the emergency communication component 416 and the vehicular communication component 446 can be performed using a number of encryption and/or decryption methods as described below. The securing of the data can insure that nefarious activity is prevented from interfering with the emergency and/or vehicle data provided to the vehicular entity and/or the emergency entity.

Figure 4B:
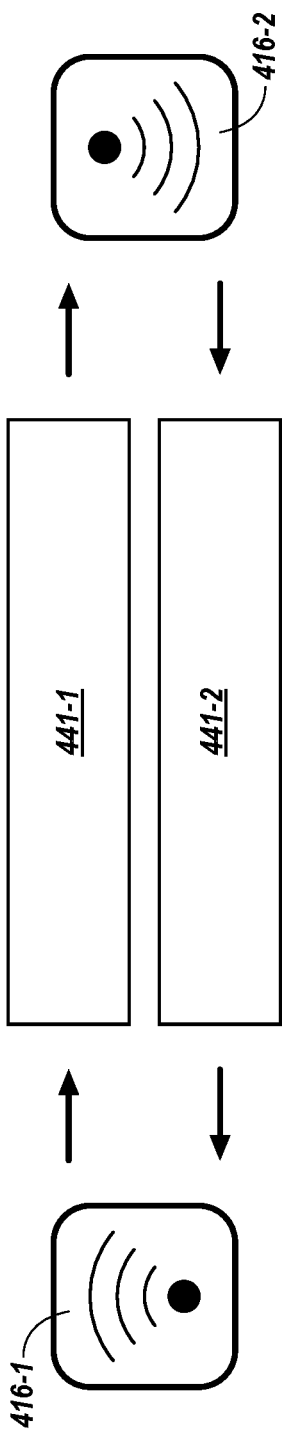

FIG. 4B is an illustration of an exchange of authentication data 441-1, 441-2 between emergency communication components 416-1, 416-2. Authentication data 441 illustrated in FIG. 4A can be a same set of data as authentication data 441-1 illustrated in FIG. 4B, except that the data is sent to an additional emergency communication component 416-2 of an additional emergency entity. Similar to the portion of authentication data 441 in FIG. 4A, the portion of authentication data 441-2 transmitted by the emergency communication component 416-2 and received by the emergency communication component 416-1 can include an emergency public identification, an emergency identification certificate, an emergency public key, an Emergency vehicle identification, a road identification, and an emergency signature. The emergency public identification can be used to determine an identity of the emergency entity and the emergency identification certificate 481 can be used to verify that the identity of the emergency entity is authenticated. However, data between the two emergency entities (or any number of emergency entities) can be used to coordinate an emergency response and/or coordinate emergency vehicles.

In one embodiment, each of the emergency entities can be provided with their own unique device secret (as is shown and described in FIGS. 5-6) used to derive their own private keys and so forth. In one embodiment, the unique device secret can be provided by a manufacturer and be immutable throughout the usage of the emergency vehicle and/or other vehicles. In one embodiment, the unique device secret can be provided by an entity such as an emergency operations center (e.g., a fire station, a police station, a hospital facility, etc.). In one embodiment, each of the emergency entities can be provided a same and/or similar device secret such that there would be a way to identify emergency vehicles or emergency vehicles would be using a same encryption across more than one emergency entity. Similarly, each same type of emergency vehicle (e.g., a group of police vehicles, a group of fire trucks, a group of ambulances, etc.) put into groups could use a same device secret.

Figure 5:
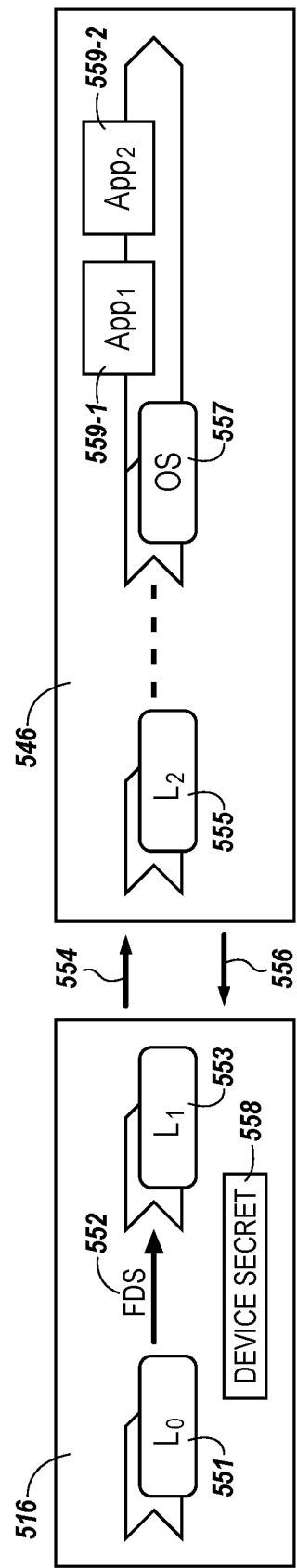
FIG. 5 is a block diagram of an example system including an emergency communication component and a vehicular communication component in accordance with an embodiment of the present disclosure.

FIG. 5 is a block diagram of an example system including a vehicular communication component 546 and an emergency communication component 516 in accordance with an embodiment of the present disclosure. As an emergency entity (e.g., 102 in FIG. 1) comes in close proximity to a vehicular entity (e.g., vehicular entity 233 in FIG. 2), the associated emergency communication component 516 (e.g., 416 in FIG. 4A) of the emergency entity can exchange data with the vehicular communication component 546 of the vehicular entity using a sensor (e.g., a radio frequency identification sensor (RFID)).

A computing device can boot in stages using layers, with each layer authenticating and loading a subsequent layer and providing increasingly sophisticated runtime services at each layer. A layer can be served by a prior layer and serve a subsequent layer, thereby creating an interconnected web of the layers that builds upon lower layers and serves higher order layers. As is illustrated in FIG. 5, Layer 0 ("$L_0$") 551 and Layer 1 ("$L_1$") 553 are within the emergency communication component 516. Layer 0 551 can provide a Firmware Derivative Secret (FDS) key 552 to Layer 1 553. The FDS key 552 can describe the identity of code of Layer 1 553 and other security relevant data. In an example, a particular protocol (such as robust internet of things (RIOT) core protocol) can use the FDS 552 to validate code of Layer 1 553 that it loads. In an example, the particular protocol can include a device identification composition engine (DICE) and/or the RIOT core protocol. As an example, an FDS can include Layer 1 firmware image itself, a manifest that cryptographically identifies authorized Layer 1 firmware, a firmware version number of signed firmware in the context of a secure boot implementation, and/or security-critical configuration settings for the device. A device secret 558 can be used to create the FDS 552 and be stored in memory of the emergency communication component 516.

The emergency communication component 516 can transmit data, as illustrated by arrow 554, to the vehicular communication component 546. The transmitted data can include an emergency identification that is public (e.g., 465 in FIG. 4), a certificate (e.g., an emergency identification certificate 481), and/or an emergency public key (e.g., 483). Layer 2 ("$L_2$") 555 of the vehicular communication component 546 can receive the transmitted data and execute the data in operations of the operating system ("OS") 557 and on a first application 559-1 and a second application 559-2.

In an example operation, the emergency communication component 516 can read the device secret 558, hash an identity of Layer 1 553, and perform a calculation including:

$$K_{L1}=KDF[Fs(s),Hash("immutable information")]$$

where $K_{L1}$ is an emergency public key, KDF (e.g., KDF defined in the National Institute of Standards and Technology (NIST) Special Publication 800-108) is a key derivation function (i.e., HMAC-SHA256), and Fs(s) is the device secret 558. FDS 552 can be determined by performing:

$$FDS=HMAC\text{-}SHA256[Fs(s),SHA256("immutable information")]$$

Likewise, the vehicular communication component 546 can transmit data, as illustrated by arrow 556, including a vehicular identification that is public (e.g., vehicular public identification 466), a vehicular certificate (e.g., a vehicular identification certificate 482), and/or a vehicular public key (e.g., public key 484).

Figure 6:
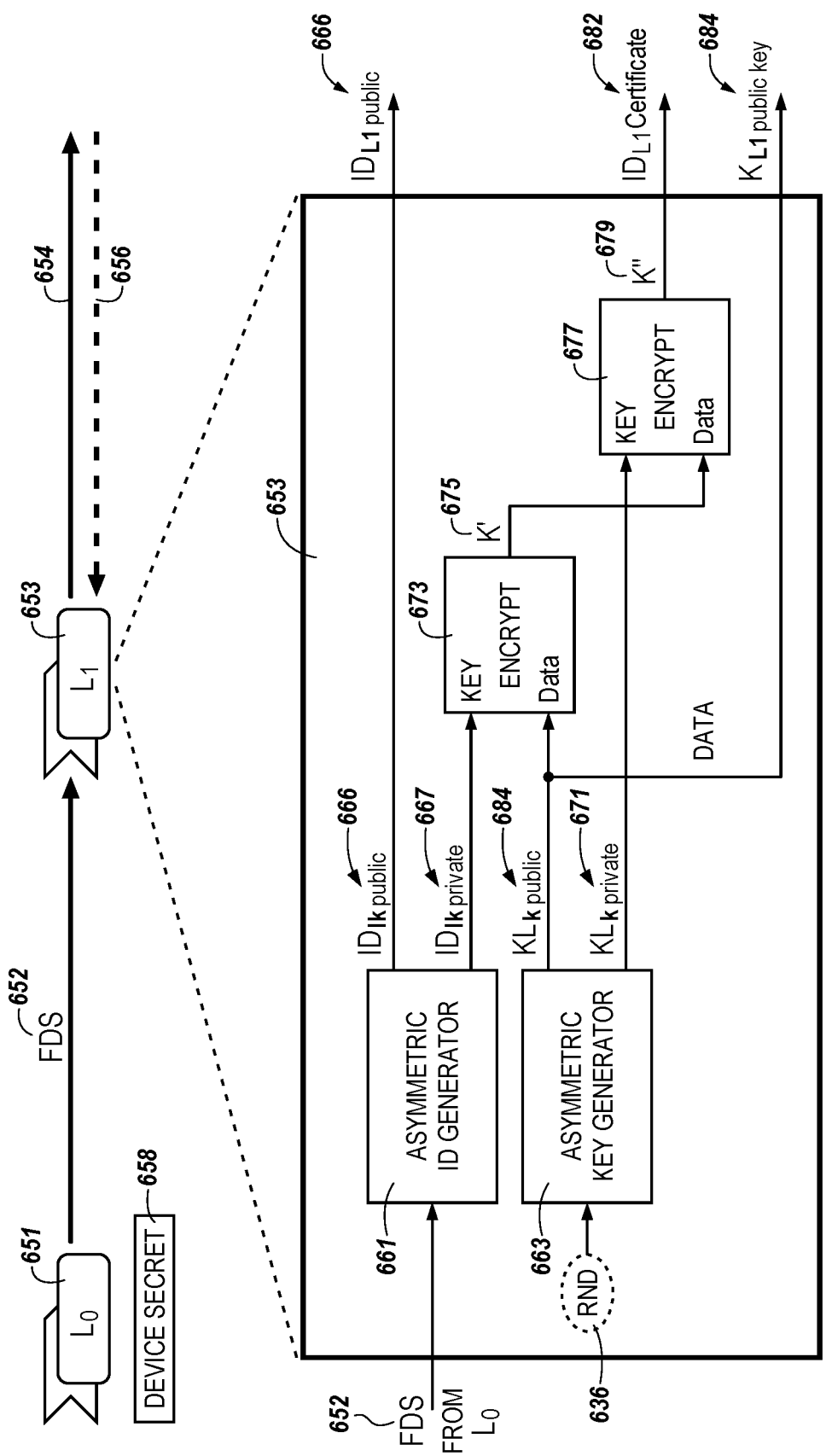
FIG. 6 is a block diagram of an example process to determine a number of parameters in accordance with an embodiment of the present disclosure.

FIG. 6 is a block diagram of an example process to determine a number of parameters in accordance with an embodiment of the present disclosure. FIG. 6 is an example of a determination of the parameters including the emergency public identification, the emergency certificate, and the emergency public key that are then sent, indicated by arrow 654, to Layer 2 (e.g., Layer 2 555) of a vehicular communication component (e.g., 546 in FIG. 5). Layer 0 ("$L_0$") 651 in FIG. 6 corresponds to Layer 0 551 in FIG. 5 and likewise FDS 652 corresponds to FDS 552, Layer 1 653 corresponds to Layer 1 553, and arrows 654 and 656 correspond to arrows 554 and 556, respectively.

The FDS 652 from Layer 0 651 is sent to Layer 1 653 and used by an asymmetric ID generator 661 to generate a public identification ("$ID_{lk\ public}$") 666 and a private identification 667. In the abbreviated "$ID_{lk\ public}$," the "lk" indicates Layer k (in this example Layer 1), and the "public" indicates that the identification is openly shared. The public identification ("$ID_{L1public}$") 666 is illustrated as shared by the arrow extending to the right and outside of Layer 1 653 of the emergency communication component. The generated private identification 667 is used as a key input into an encryptor 673. The encryptor 673 can be any processor, computing device, etc. used to encrypt data.

Layer 1 653 of an emergency communication component can include an asymmetric key generator 663. In at least one example, a random number generator (RND) 636 can optionally input a random number into the asymmetric key generator 663. The asymmetric key generator 663 can generate a public key ("$K_{Lk\ public}$") 684 (referred to as an emergency public key) and a private key ("$K_{LK\ private}$") 671 (referred to as an emergency private key) associated with an emergency communication component such as emergency communication component 516 in FIG. 5. The emergency public key 684 can be an input (as "data") into the encryptor 673. The encryptor 673 can generate a result K' 675 using the inputs of the emergency private identification 667 and the emergency public key 684. The emergency private key 671 and the result K' 675 can be input into an additional encryptor 677, resulting in output K" 679. The output K" 679 is the emergency certificate ("$ID_{L1}$ certificate") 682 transmitted to the Layer 2 (555 of FIG. 5). The emergency certificate 682 can provide an ability to verify and/or authenticate an origin of data sent from an emergency entity. As an example, data sent from the emergency communication component can be associated with an identity of the emergency communication component by verifying the certificate, as will be described further in association with FIG. 8. Further, the emergency public key ("$K_{L1\ public\ key}$") 684 can be transmitted to Layer 2. Therefore, the public identification 666, the certificate 682, and the emergency public key 684 of a Layer 1 653 of an emergency communication component can be transmitted to Layer 2 of a vehicular communication component.

Figure 7:
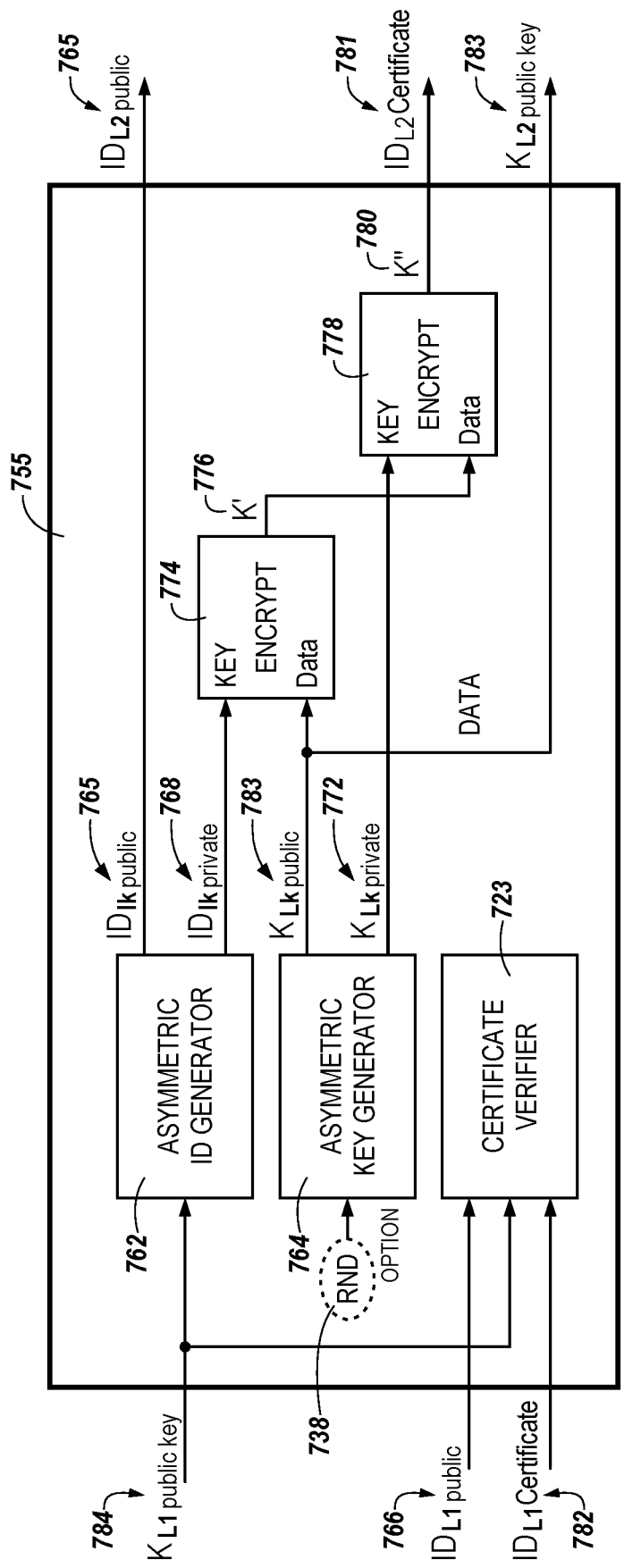
FIG. 7 is a block diagram of an example process to determine a number of parameters in accordance with an embodiment of the present disclosure.

FIG. 7 is a block diagram of an example process to determine a number of parameters in accordance with an embodiment of the present disclosure. FIG. 7 illustrates a Layer 2 755 of a vehicular communication component (e.g., vehicular communication component 546 in FIG. 5) generating a vehicular identification ("$ID_{L2}$ public") 765, a vehicular certificate ("$ID_{L2}$ Certificate") 781, and a vehicular public key ("$K_{L2\ public\ key}$") 783.

The emergency public key ("$K_{L1\ public\ key}$") 784 transmitted from Layer 1 of the emergency communication component to Layer 2 755 of a vehicular communication component, as described in FIG. 6, is used by an asymmetric ID generator 762 of the vehicular communication component to generate a public identification ("$ID_{lk\ public}$") 765 and a private identification 768 of the vehicular communication component. In the abbreviated "$ID_{lk\ public}$," the "lk" indicates Layer k (in this example Layer 2), and the "public" indicates that the identification is openly shared. The public identification 765 is illustrated as shared by the arrow extending to the right and outside Layer 2 755. The generated private identification 768 is used as a key input into an encryptor 774.

As shown in FIG. 7, the vehicular certificate 782 and vehicular identification 766, along with the vehicular public key 784, are used by a certificate verifier 723. The certificate verifier 723 can verify the vehicular certificate 782 received from a host (e.g., host 516), and determine, in response to the vehicular certificate 782 being verified or not being verified, whether to accept or discard data received from the host. Further details of verifying the vehicular certificate 782 are described in connection with FIG. 8.

Layer 2 755 of the vehicular communication component can include an asymmetric key generator 764. In at least one example, a random number generator (RND) 638 can optionally input a random number into the asymmetric key generator 764. The asymmetric key generator 764 can generate a public key ("$K_{LK\ public}$") 783 (referred to as a vehicular public key) and a private key ("$K_{LK\ private}$") 772 (referred to as a vehicular private key) associated with a vehicular communication component such as vehicular communication component 546 in FIG. 5. The vehicular public key 783 can be an input (as "data") into the encryptor 774. The encryptor 774 can generate a result K' 776 using the inputs of the vehicular private identification 768 and the vehicular public key 783. The vehicular private key 772 and the result K' 776 can be input into an additional encryptor 778, resulting in output K" 780. The output K" 780 is the vehicular certificate ("$ID_{L2}$ certificate") 781 transmitted back to the Layer 1 (553 of FIG. 5). The vehicular certificate 781 can provide an ability to verify and/or authenticate an origin of data sent from an apparatus. As an example, data sent from the vehicular communication component can be associated with an identity of the vehicular communication component by verifying the certificate, as will be described further in association with FIG. 8. Further, the vehicular public key ("$K_{L2\ public\ key}$") 783 can be transmitted to Layer 1. Therefore, the public identification 765, the certificate 781, and the vehicular public key 783 of the vehicular communication component can be transmitted to Layer 1 of an emergency communication component.

In an example, in response to a vehicular communication component receiving a public key from an emergency communication component, the vehicular communication component can encrypt data to be sent to the emergency communication component using the emergency public key. Vice versa, the emergency communication component can encrypt data to be sent to the vehicular communication component using the vehicular public key. In response to the vehicular communication component receiving data encrypted using the vehicular public key, the vehicular communication component can decrypt the data using its own vehicular private key. Likewise, in response to the emergency communication component receiving data encrypted using the emergency public key, the emergency communication component can decrypt the data using its own emergency private key. As the vehicular private key is not shared with another device outside the vehicular communication component and the emergency private key is not shared with another device outside the emergency communication component, the data sent to the vehicular communication component and the emergency communication component remains secure.

Figure 8:
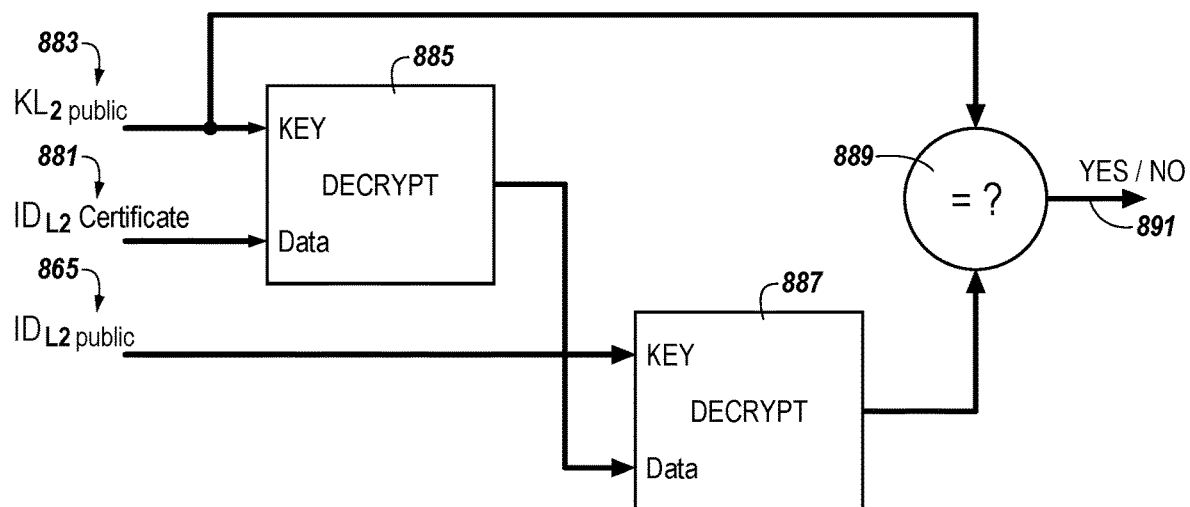
FIG. 8 is a block diagram of an example process to verify a certificate in accordance with an embodiment of the present disclosure.

FIG. 8 is a block diagram of an example process to verify a certificate in accordance with an embodiment of the present disclosure. In the illustrated example of FIG. 8, a public key 883, a certificate 881, and a public identification is provided from a vehicular communication component (e.g., from Layer 2 555 of vehicular communication component 546 in FIG. 5). The data of the certificate 881 and the emergency public key 883 can be used as inputs into a decryptor 885. The decryptor 885 can be any processor, computing device, etc. used to decrypt data. The result of the decryption of the certificate 881 and the emergency public key 883 can be used as an input into a secondary decryptor 887 along with the public identification, result in an output. The vehicular public key 883 and the output from the decryptor 887 can indicate, as illustrated at 889, whether the certificate is verified, resulting in a yes or no 891 as an output. In response to the certificate being verified, data received from the device being verified can be accepted, decrypted, and processed. In response to the certificate not being verified, data received from the device being verified can be discarded, removed, and/or ignored. In this way, nefarious devices sending nefarious data can be detected and avoided. As an example, a hacker sending data to be processed can be identified and the hacking data not processed.

Figure 9:
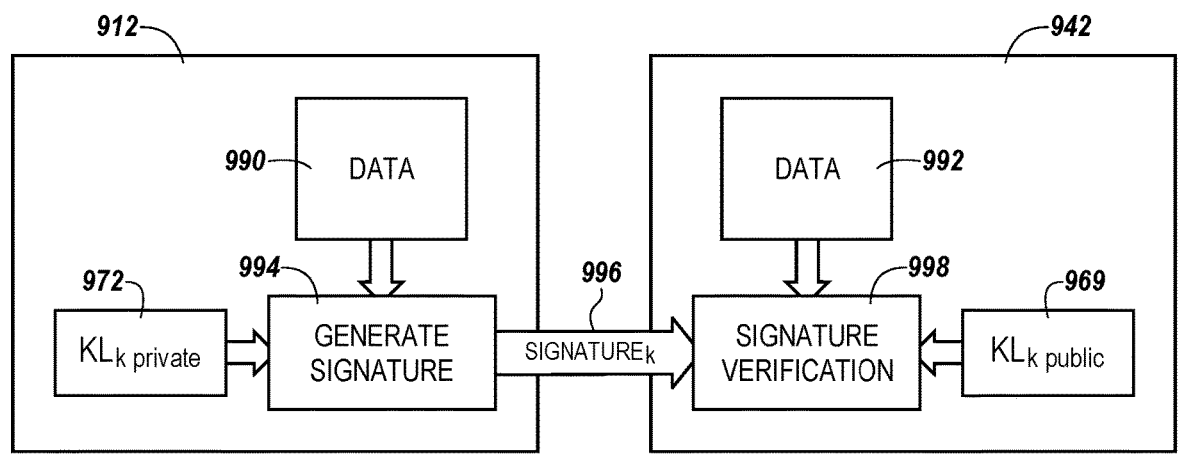
FIG. 9 is a block diagram of an example process to verify a signature in accordance with an embodiment of the present disclosure.

FIG. 9 is a block diagram of an example process to verify a signature in accordance with an embodiment of the present disclosure. In the instance where a device is sending data that may be verified in order to avoid subsequent repudiation, a signature can be generated and sent with data. As an example, a first device may make a request of a second device and once the second device performs the request, the first device may indicate that the first device never made such a request. An anti-repudiation approach, such as using a signature, can avoid repudiation by the first device and insure that the second device can perform the requested task without subsequent difficulty.

An emergency computing device 912 (such as emergency computing device 112 in FIG. 1) can send data 990 to a vehicular computing device (such as vehicular computing device 242). The emergency computing device 912 can generate, at 994, a signature 996 using an emergency private key 972. The signature 996 can be transmitted to the vehicular computing device 942. The vehicular computing device 942 can verify, at 998, using data 992 and the emergency public key 984 previously received. In this way, signature verification operates by using a private key to encrypt the signature and a public key to decrypt the signature. In this way, the private key used to generate a unique signature can remain private to the device sending the signature while allowing the receiving device to be able to decrypt the signature using the public key of the sending device for verification. This is in contrast to encryption/decryption of the data, which is encrypted by the sending device using the public key of the receiving device and decrypted by the receiving device using the private key of the receiver. In at least one example, the vehicle can verify the digital signature by using an internal cryptography process (e.g., Elliptical Curve Digital signature (ECDSA) or a similar process.

Figure 10:
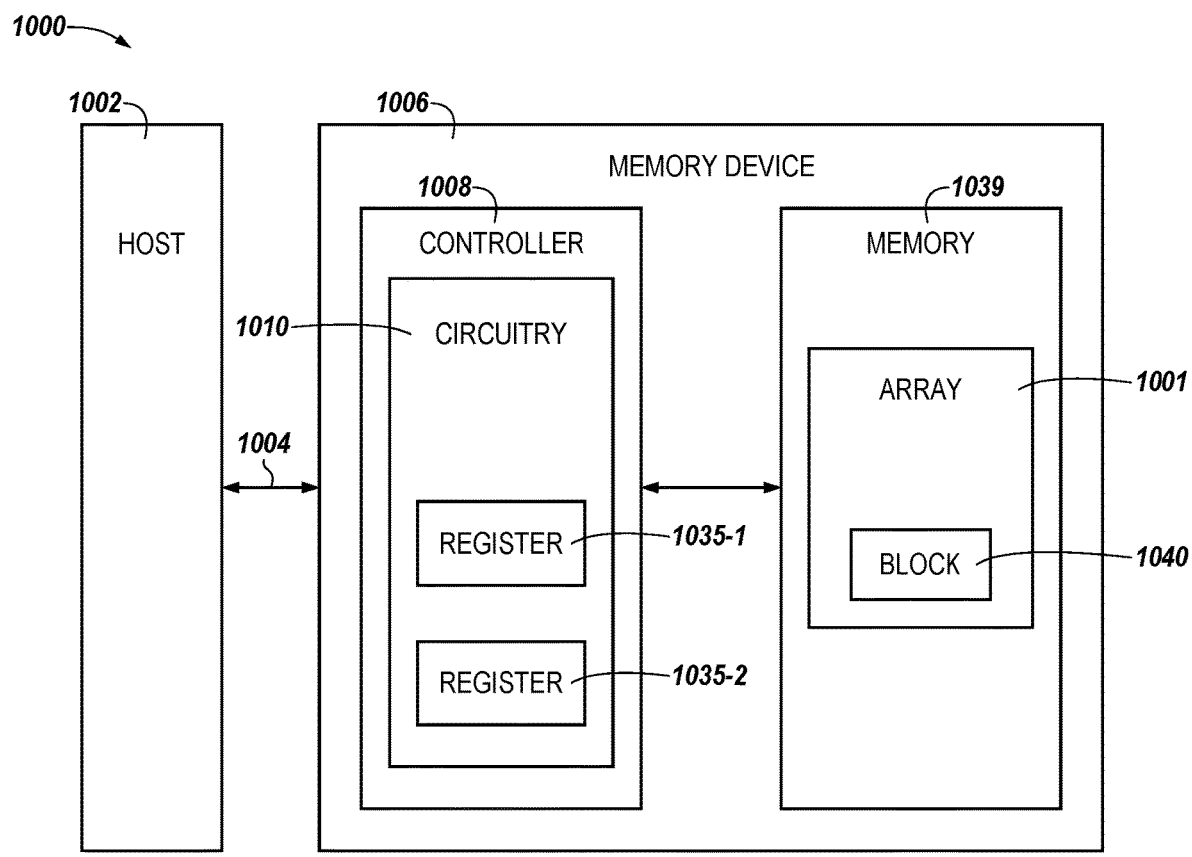
FIG. 10 is a block diagram of a computing system including a host and an apparatus in the form of a memory device in accordance with an embodiment of the present disclosure.

FIG. 10 is a block diagram of a computing system 1000 including a host 1002 and an apparatus in the form of a memory device 1006 in accordance with an embodiment of the present disclosure. As used herein, an "apparatus" can refer to, but is not limited to, any of a variety of structures or combinations of structures, such as a circuit or circuitry, a die or dice, a module or modules, a device or devices, or a system or systems, for example. Further, in an embodiment, computing system 1000 can include a number of memory devices analogous to memory device 1006.

In the embodiment illustrated in FIG. 10, memory device 1006 can include a memory 1039 having a memory array 1001. Memory array 1001 can be a secure array, as will be further described herein. Although one memory array 1001 is illustrated in FIG. 10, memory 1039 can include any number of memory arrays analogous to memory array 1001.

As illustrated in FIG. 10, host 1002 can be coupled to the memory device 1006 via interface 1004. Host 1002 and memory device 1006 can communicate (e.g., send commands and/or data) on interface 1004. Host 1002 and/or memory device 1006 can be, or be part of, a laptop computer, personal computer, digital camera, digital recording and playback device, mobile telephone, PDA, memory card reader, interface hub, or Internet of Things (IoT) enabled device, such as, for instance, an automotive (e.g., vehicular and/or transportation infrastructure) IoT enabled device, among other host systems, and can include a memory access device (e.g., a processor). One of ordinary skill in the art will appreciate that "a processor" can intend one or more processors, such as a parallel processing system, a number of coprocessors, etc.

Interface 1004 can be in the form of a standardized physical interface. For example, when memory device 1006 is used for information storage in computing system 1000, interface 1004 can be a serial advanced technology attachment (SATA) physical interface, a peripheral component interconnect express (PCIe) physical interface, a universal serial bus (USB) physical interface, or a small computer system interface (SCSI), among other physical connectors and/or interfaces. In general, however, interface 1004 can provide an interface for passing control, address, information (e.g., data), and other signals between memory device 1006 and a host (e.g., host 1002) having compatible receptors for interface 1004.

Memory device 1006 includes controller 1008 to communicate with host 1002 and with memory 1039 (e.g., memory array 1001). For instance, controller 1008 can send commands to perform operations on memory array 1001, including operations to sense (e.g., read), program (e.g., write), move, and/or erase data, among other operations.

Controller 1008 can be included on the same physical device (e.g., the same die) as memory 1039. Alternatively, controller 1008 can be included on a separate physical device that is communicatively coupled to the physical device that includes memory 1039. In an embodiment, components of controller 1008 can be spread across multiple physical devices (e.g., some components on the same die as the memory, and some components on a different die, module, or board) as a distributed controller.

Host 1002 can include a host controller (not shown FIG. 10) to communicate with memory device 1006. The host controller can send commands to memory device 1006 via interface 1004. The host controller can communicate with memory device 1006 and/or the controller 1008 on the memory device 1006 to read, write, and/or erase data, among other operations. Further, in an embodiment, host 1002 can be an IoT enabled device, as previously described herein, having IoT communication capabilities.

Controller 1008 on memory device 1006 and/or the host controller on host 1002 can include control circuitry and/or logic (e.g., hardware and firmware). In an embodiment, controller 1008 on memory device 1006 and/or the host controller on host 1002 can be an application specific integrated circuit (ASIC) coupled to a printed circuit board including a physical interface. Also, memory device 1006 and/or host 1002 can include a buffer of volatile and/or non-volatile memory and a number of registers.

For example, as shown in FIG. 10, memory device can include circuitry 1010. In the embodiment illustrated in FIG. 10, circuitry 1010 is included in controller 1008. However, embodiments of the present disclosure are not so limited. For instance, in an embodiment, circuitry 1010 may be included in (e.g., on the same die as) memory 1039 (e.g., instead of in controller 1008). Circuitry 1010 can comprise, for instance, hardware, firmware, and/or software.

Circuitry 1010 can generate a block 1040 in a block chain for validating (e.g., authenticating and/or attesting) the data stored in memory 1039 (e.g., in memory array 1001). The block 1040 can include a cryptographic hash of (e.g., a link to) the previous block in the block chain, and a cryptographic hash of (e.g., identifying) the data stored in memory array 1001. The block 1040 can also include a header having a timestamp indicating when the block was generated. Further, the block 1040 can have a digital signature associated therewith that indicates the block is included in the block chain.

The cryptographic hash of the data stored in memory array 1001, and/or the cryptographic hash of the previous block in the block chain, can comprise, for instance, a SHA-256 cryptographic hash. Further, the cryptographic hash of the data stored in memory array 1001, and the cryptographic hash of the previous block in the block chain, can each respectively comprise 256 bytes of data.

The cryptographic hash of the data stored in memory array 1001 can be generated (e.g., calculated), for example, by circuitry 1010. In such an example, the cryptographic hash of the data stored can be internally generated by memory device 1006 without having external data moving on interface 1004. As an additional example, the cryptographic hash of the data can be communicated from an external entity. For instance, host 1002 can generate the cryptographic hash of the data stored in memory array 1001, and send the generated cryptographic hash to memory device 1006 (e.g., circuitry 1010 can receive the cryptographic hash of the data stored in memory array 1001 from host 1002).

The digital signature associated with the block 1040 can be generated (e.g., calculated), for example, by circuitry 1010 based on (e.g., responsive to) an external command, such as a command received from host 1002. For instance, the digital signature can be generated using symmetric or asymmetric cryptography. As an additional example, host 1002 can generate the digital signature, and send (e.g. provide) the generated digital signature to memory device 1006 (e.g., circuitry 1010 can receive the digital signature from host 1002).

As shown in FIG. 10, the block 1040, as well as the digital signature associated with block 1040, can be stored in memory array 1001. For example, the block 1040 can be stored in a portion of memory array 1001 that is inaccessible to a user of memory device 1006 and/or host 1002 (e.g., in a "hidden" region of memory array 1001). Storing the block 1040 in memory array 1001 can simplify the storage of the block by, for example, removing the need for software storage management for the block.

In an embodiment, memory array 1001 (e.g., a subset of array 1001, or the whole array 1001) can be a secure array (e.g., an area of memory 1039 to be kept under control). For example, the data stored in memory array 1001 can include sensitive (e.g., non-user) data, such as host firmware and/or code to be executed for sensitive applications. In such an embodiment, a pair of non-volatile registers can be used to define the secure array. For example, in the embodiment illustrated in FIG. 10, circuitry 1010 includes registers 1035-1 and 1035-2 that can be used to define the secure array. For instance, register 1035-1 can define the address (e.g., the starting LBA of the data) of the secure array, and register 1035-2 can define the size (e.g., the ending LBA of the data) of the secure array. Once the secure array has been defined, circuitry 1010 can generate (e.g., calculate) a cryptographic hash associated with the secure array, which may be referred to herein as a golden hash, using authenticated and antireplay protected commands (e.g., so that only memory device 1006 knows the golden hash, and only memory device 1006 is capable of generating and updating it). The golden hash may be stored in inaccessible portion of memory array 1001 (e.g., the same inaccessible portion in which block 1040 is stored), and can be used during the process of validating the data of the secure array, as will be further described herein.

Memory device 1006 (e.g., circuitry 1010) can send, via interface 1004, the block 1040, along with the digital signature associated with block 1040, to host 1002 for validation of the data stored in memory array 1001. For example, circuitry 1010 can sense (e.g., read) the block 1040 stored in memory array 1001, and send the sensed block to host 1002 for validation of the data stored in array 1001, responsive to a powering (e.g., a powering on and/or powering up) of memory device 1006. As such, a validation of the data stored in memory array 1001 can be initiated (e.g., automatically) upon the powering of memory device 1006.

As an additional example, circuitry 1010 can send the block 1040, along with the digital signature associated with block 1040, to host 1002 upon an external entity, such as host 1002, initiating a validation of the data stored in memory array 1001. For instance, host 1002 can send a command to memory device 1006 (e.g., circuitry 1010) to sense the block 1040, and circuitry 1010 can execute the command to sense the block 1040, and send the sensed block to host 1002 for validation of the data stored in array 1001, responsive to receipt of the command.

Upon receiving the block 1040, host 1002 can validate (e.g., determine whether to validate) the data stored in memory array 1001 using the received block. For example, host 1002 can use the cryptographic hash of the previous block in the block chain and the cryptographic hash of the data stored in memory array 1001 to validate the data. Further, host 1002 can validate the digital signature associated with the block 1040 to determine the block is included (e.g., is eligible to be included) in the block chain. As used herein, validating the data stored in memory array 1001 can include, and/or refer to, authenticating and/or attesting that the data is genuine (e.g., is the same as originally programmed), and has not been altered by hacking activity or other unauthorized changes.

In embodiments in which memory array 1001 is a secure array, the golden hash previously described herein may also be used to validate the data stored in memory array 1001. For example, a run-time cryptographic hash can be generated (e.g., calculated), and compared with the golden hash. If the comparison indicates the run-time and golden hashes match, it can be determined that the secure array has not been altered, and therefore the data stored therein is valid. If, however, the comparison indicates the run-time and golden hashes do not match, this may indicate that the data stored in the secure array has been changed (e.g., due to a hacker or a fault in the memory), and this can be reported to host 1002.

After the validation of the data stored in memory array 1001, circuitry 1010 can generate an additional (e.g., the next) block in the block chain for validating the data stored in memory array 1001, in a manner analogous to which the block 1040 was generated. For example, this additional block can include a cryptographic hash of block 1040, which has now become the previous block in the block chain, and a new cryptographic hash of the data stored in memory array 1001. Further, this additional block can include a header having a timestamp indicating when this block was generated, and can have a digital signature associated therewith that indicates this block is included in the block chain. Further, in embodiments in which memory array 1001 is a secure array, an additional (e.g., new) golden hash can be generated.

The additional block, as well as the digital signature associated with the additional block, and the additional golden hash, can be stored in memory array 1001. For example, the additional block can replace block 1040 (e.g., the previous block) in memory array 1001. The additional block, digital signature, and additional golden hash can then be used by host 1002 to validate the data stored in memory array 1001, in a manner analogous to that previously described herein for block 1040. Additional blocks in the block chain can continue to be generated by circuitry 1010, and used by host 1002 to validate the data stored in memory array 1001, in such manner throughout the lifetime of memory device 1006.

The embodiment illustrated in FIG. 10 can include additional circuitry, logic, and/or components not illustrated so as not to obscure embodiments of the present disclosure. For example, memory device 1006 can include address circuitry to latch address signals provided over I/O connectors through I/O circuitry. Address signals can be received and decoded by a row decoder and a column decoder, to access memory array 1001. Further, memory device 1006 can include a main memory, such as, for instance, a DRAM or SDRAM, that is separate from and/or in addition to memory array 1001. An example further illustrating additional circuitry, logic, and/or components of memory device 1006 will be further described herein (e.g., in connection with FIG. 10).

Figure 11:
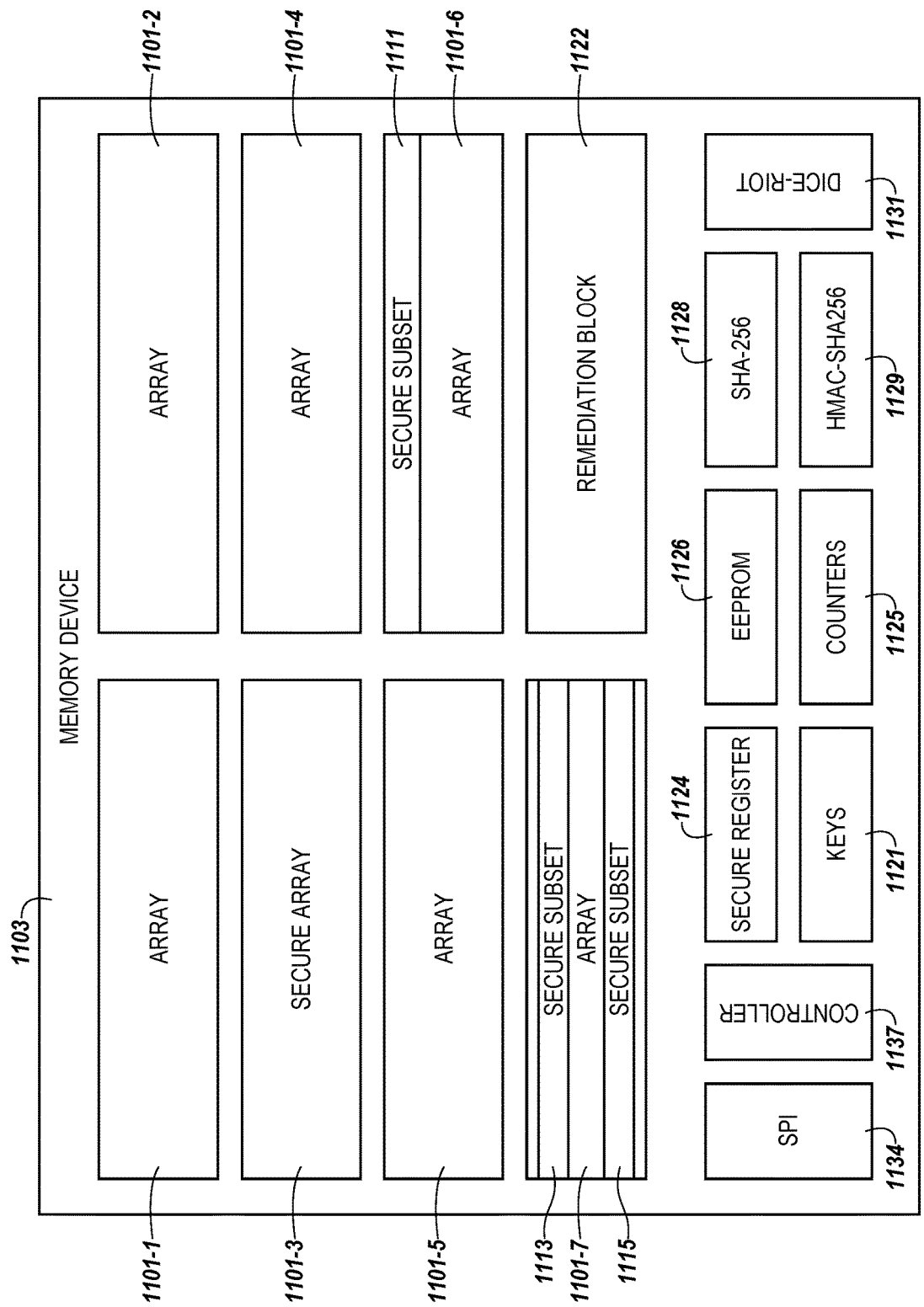
FIG. 11 is a block diagram of an example memory device in accordance with an embodiment of the present disclosure.

FIG. 11 is a block diagram of an example memory device 1103 in accordance with an embodiment of the present disclosure. Memory device 1103 can be, for example, emergency computing device 112, a component of emergency computing device 112, vehicular computing device 242, or a component of vehicular computing device 242, as described in association with FIGS. 1 and 2, among other such devices. Further, memory device 1103 can be a same memory device as memory device 1006 described in association with FIG. 10.

As shown in FIG. 11, memory device 1103 can include a number of memory arrays 1101-1 through 1101-7. Further, in the example illustrated in FIG. 11, memory array 1101-3 is a secure array, subset 1111 of memory array 1101-6 comprises a secure array, and subsets 1113 and 1115 of memory array 1101-7 comprise a secure array. Subsets 1111, 1113, and 1115 can each include, for instance, 4 kilobytes of data. However, embodiments of the present disclosure are not limited to a particular number or arrangement of memory arrays or secure arrays.

As shown in FIG. 11, memory device 1103 can include a remediation (e.g., recovery) block 1122. Remediation block 1122 can be used as a source of data in case of errors (e.g., mismatches) that may occur during operation of memory device 1103. Remediation block 1122 may be outside of the area of memory device 1103 that is addressable by a host.

As shown in FIG. 11, memory device 1103 can include a serial peripheral interface (SPI) 1134 and a controller 1137. Memory device 1103 can use SPI 1134 and controller 1137 to communicate with a host and memory arrays 1101-1 through 1101-7.

As shown in FIG. 11, memory device 1103 can include a secure register 1124 for managing the security of memory device 1103. For example, secure register 1124 can configure, and communicate externally, to an application controller. Further, secure register 1124 may be modifiable by an authentication command.

As shown in FIG. 11, memory device 1103 can include keys 1121. For instance, memory device 1103 can include eight different slots to store keys such as root keys, DICE-RIOT keys, and/or other external session keys.

As shown in FIG. 11, memory device 1103 can include an electronically erasable programmable read-only memory (EEPROM) 1126. EEPROM 1126 can provide a secure non-volatile area available for a host, in which individual bytes of data can be erased and programmed.

As shown in FIG. 11, memory device 1103 can include counters (e.g., monotonic counters) 1125. For instance, memory device 1103 can include six different monotonic counters, two of which may be used by memory device 1103 for authenticated commands, and four of which may be used by the host.

As shown in FIG. 11, memory device 1103 can include an SHA-256 cryptographic hash function 1328, and/or an HMAC-SHA256 cryptographic hash function 1129. SHA-256 and/or HMAC-SHA256 cryptographic hash functions 1128 and 1129 can be used by memory device 1103 to generate cryptographic hashes, such as, for instance, the cryptographic hash of a command as previously described herein, and/or a golden hash used to validate data stored in memory arrays 1101-1 through 1101-7. Further, memory device 1103 can support L0 and L1 of DICE-RIOT 1131.

In the preceding detailed description, reference is made to the accompanying drawings that form a part hereof, and in which is shown, by way of illustration, specific examples. In the drawings, like numerals describe substantially similar components throughout the several views. Other examples may be utilized, and structural, logical and/or electrical changes may be made without departing from the scope of the present disclosure.

The figures herein follow a numbering convention in which the first digit or digits correspond to the drawing figure number and the remaining digits identify an element or component in the drawing. Similar elements or components between different figures may be identified by the use of similar digits. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate the embodiments of the present disclosure and should not be taken in a limiting sense.

As used herein, "a," "an," or "a number of" something can refer to one or more of such things. A "plurality" of something intends two or more. As used herein, the term "coupled" may include electrically coupled, directly coupled, and/or directly connected with no intervening elements (e.g., by direct physical contact) or indirectly coupled and/or connected with intervening elements. The term coupled may further include two or more elements that co-operate or interact with each other (e.g., as in a cause and effect relationship).

Although specific examples have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. The scope of one or more examples of the present disclosure should be determined with reference to the appended claims, along with the full range of equivalents to which such claims are entitled.

What is claimed is:

1. An apparatus, comprising:
   a hardware processing resource;
   memory having instructions executable by the hardware processing resource; and
   an emergency communication component coupled to the hardware processing resource, wherein the emergency communication component is configured to, in response to:
      being a particular proximity to a vehicular entity; and
      receiving a vehicular public key from a vehicular communication component associated with a vehicular entity:
         generate an emergency private key and an emergency public key, wherein:
            the emergency private key is generated using a device secret that is provided to the emergency communication component at manufacturing and is immutable; and
            a same device secret as the device secret is used to generate an additional emergency private key associated with an additional emergency communication component and
         provide the emergency public key, an emergency signature, and notification data to the vehicular communication component.

2. The apparatus of claim 1, wherein the emergency communication component is configured to encrypt the notification data using the vehicular public key.

3. The apparatus of claim 1, wherein the notification data indicates to the vehicular entity to perform an action.

4. The apparatus of claim 1, wherein the emergency communication component is further configured to, in response to being the particular proximity to the vehicular entity:
   receive data from the vehicular communication component; and
   decrypt the received data using the emergency private key.

5. The apparatus of claim 4, wherein the emergency communication component is further configured to determine that the vehicular entity performed the action based on the decrypted received data.

6. The apparatus of claim 1, wherein the emergency communication component configured to provide the notification data comprises the emergency communication component configured to provide an indication for the vehicular entity to pull over and come to a complete stop.

7. The apparatus of claim 1, wherein the emergency communication component configured to provide the notification data comprises the emergency communication component configured to provide an indication for the vehicular entity that an emergency entity associated with the emergency communication component is approaching the vehicular entity.

8. The apparatus of claim 1, wherein the emergency communication component is associated with an emergency entity and the emergency entity is one of a fire truck, a police vehicle, and an ambulance.

9. The apparatus of claim 1, wherein the emergency signature that the emergency communication component is configured to provide indicates an identity of an emergency entity associated with the emergency communication component.

10. The apparatus of claim 1, wherein the emergency communication component is configured to send data to the vehicular communication component indicating an emergency is no longer in effect within a particular proximity of the vehicular entity.

11. The apparatus of claim 1, wherein the emergency communication component is configured to provide the emergency public key to the vehicular communication component using radio-frequency identification (RFID).

12. An apparatus, comprising:
a hardware processing resource;
memory having instructions executable by the hardware processing resource; and
a vehicular communication component coupled to the hardware processing resource, wherein the vehicular communication component is configured to, in response to:
being a particular proximity to an emergency entity; and
receiving an emergency public key, an emergency signature, and notification data from an emergency communication component associated with the emergency entity, wherein:
the emergency signature is generated using a device secret unique to the emergency entity and to an additional emergency entity; and
the same device secret is used to generate an additional emergency private key associated with the additional emergency entity;
verify an identity of the emergency entity based on the received emergency signature;
generate a vehicular private key and a vehicular public key to provide to the emergency communication component; and
in response to verifying the identity of the emergency entity, perform an action associated with the notification data.

13. The apparatus of claim 12, wherein the vehicular communication component is further configured to provide, to the emergency communication component, confirmation that the action has been performed.

14. The apparatus of claim 12, wherein the vehicular communication component is configured to, in response to being unable to verify the identity of the emergency entity, determining to ignore the received notification data and not perform the action.

15. The apparatus of claim 14, wherein the vehicular communication component is further configured to, in response to being unable to verify the identity of the emergency entity, requesting additional data to be verified.

16. A method comprising:
generating, by a vehicular communication component, a vehicular private key and a vehicular public key;
providing the vehicular public key to an emergency communication component;
receiving an emergency public key, an emergency signature, and notification data, wherein the notification data is encrypted using the vehicular public key, wherein the emergency signature is generated using a device secret unique to the emergency entity and to at least one additional emergency entity;
decrypting the notification data using the vehicular private key;
verifying the identity of an emergency entity associated with the emergency communication component by analyzing the emergency signature; and
in response to verification of the identity of the emergency entity, performing an action indicated by the notification data.

17. The method of claim 16, further comprising providing confirmation data from the vehicular communication component to the emergency communication component that confirms the action was performed, wherein the confirmation data is encrypted using the emergency public key.

18. The method of claim 16, wherein analyzing the emergency signature comprises decrypting the emergency signature using the emergency public key.

19. The method of claim 16, wherein the notification data comprises an indication to perform an action comprising one of pulling to a side of a roadway that the vehicular entity is on, exiting a roadway that the vehicular entity is on, gaining priority on a roadway.

20. The method of claim 16, wherein the encrypting and decrypting are performed using a device identification composition engine (DICE)-robust internet of thing (RIOT) protocol.

21. A system, comprising:
a vehicular entity, comprising:
a hardware vehicular processing resource; and
a vehicular communication component coupled to the hardware vehicular entity and configured to generate a vehicular private key and a vehicular public key; and
an emergency entity comprising:
a hardware emergency processing resource; and
an emergency communication component coupled to the hardware emergency processing resource and configured to:
generate an emergency private key and an emergency public key, wherein the emergency private key is generated using a device secret unique to a plurality of emergency entities and the plurality of emergency entities use the same device secret to generate a respective additional emergency private key and additional public key;
receive the vehicular public key; and
encrypt:
data from the emergency entity using the vehicular public key, wherein the data from the emergency entity indicates an action to be performed by the vehicular entity; and
an emergency signature encrypted using the emergency private key;
wherein the vehicular communication component is further configured to:
receive the emergency public key, the data from the emergency entity, and the emergency signature;
decrypt:
the data from the emergency entity using the vehicular private key; and
the emergency signature using the emergency public key.

22. The apparatus of claim 21, wherein the vehicular communication component is further configured to encrypt confirmation data from the vehicular entity using the emergency public key, wherein the encrypted confirmation data indicates that the action has been performed by the vehicular entity.

23. The system of claim 22, wherein the emergency communication component is further configured to:
   receive the encrypted confirmation data from the vehicular entity; and
   decrypt the confirmation data from the vehicular entity using the emergency private key.

* * * * *